Dec. 5, 1939.  J. A. BALL ET AL  2,182,142
DIVIDING POLARIZED LIGHT BEAMS
Filed Feb. 12, 1937
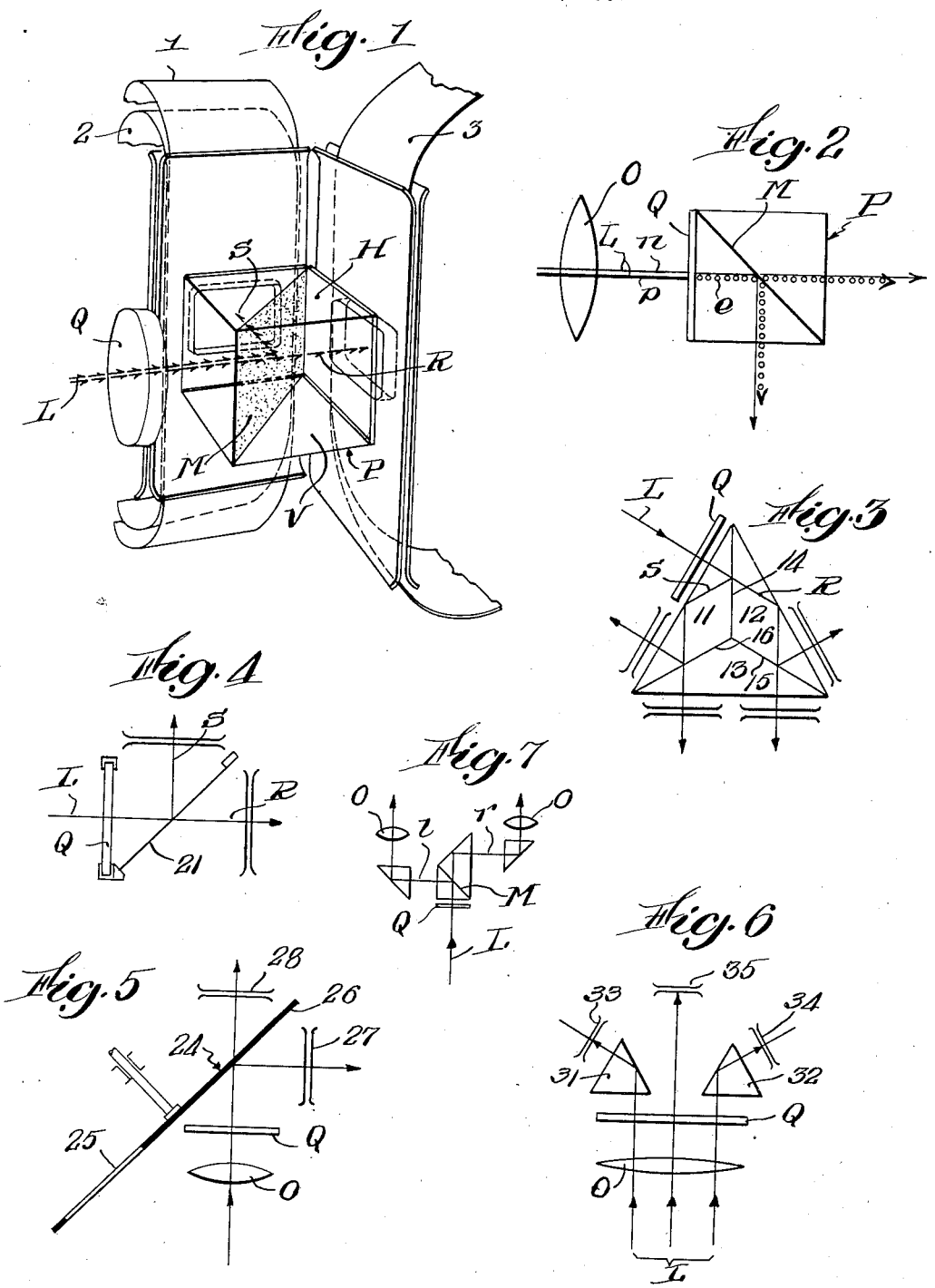
Inventors:
Joseph A. Ball,
Winton C. Hoch
by Roberts, Cushman & Woodberry
Attys.

Patented Dec. 5, 1939

2,182,142

UNITED STATES PATENT OFFICE 2,182,142

DIVIDING POLARIZED LIGHT BEAMS

Joseph A. Ball and Winton C. Hoch, Los Angeles, Calif., assignors to Technicolor Motion Picture Corporation, Boston, Mass., a corporation of Maine Application February 12, 1937, Serial No. 125,488

9 Claims. (Cl. 95—2)

This invention is concerned with optical devices, especially with arrangements using reflectors for the purpose of dividing light beams.

Light dividing devices of various types are used in optical apparatus such as range finders, stereomicroscopes, interferometers, and especially in apparatus for recording or reproducing different aspects of an object field, for purposes of stereoscopic and color photography. In such apparatus it is frequently necessary not only to divide an impinging light beam into two or more beams, but especially to maintain a predetermined ratio of the intensities of the component beams. In the case of cameras for color photography, for example, it would otherwise become impossible to control the component color aspect records for true recordation and proper balance with regard to subsequent reproduction processes.

When photographing color separation records with motion picture cameras employing a light splitter, it was frequently found impossible to maintain the theoretically and experimentally predetermined ratio of light division; for example, the recordation of certain high lights would vary so much that, in the final print, they appeared at one time decidedly green, and then again reddish. After considerable experimentation, it was determined that the printing process was not the cause of trouble, but that the transmission-reflection ratio of the light divider varied. Further research lead to the conclusion that the difficulty was due to the fact that the light reflected into the camera from most objects is more or less polarized, and that the effect of the reflector used for dividing light beams of this nature varies considerably with the ratio of incident unpolarized and polarized light, respectively, and the characteristics of the polarized light itself.

It is the principal object of the present invention to provide an arrangement rendering the function of a reflector for practical purposes insensitive to polarization characteristics of the light impinging thereon. In its general aspect, the invention accomplishes this result by converting light to be reflected, before it is actually reflected, into a form in which it is uniformly affected by the reflector, regardless of the modifications of which it may have been previously composed, and independent of spatial relations between reflector and light rays.

In another aspect, the invention proposes the conversion of plane polarized light, before it reaches the reflector, into polarized light of a type which is reflected substantially in the same manner as non-polarized light.

Another object of the invention is to provide light totally or partially reflecting devices, for use in optical apparatus having in their light path in front of the reflector an element, easily incorporated in devices of this type, which renders the reflection properties insensitive to the polarization characteristics of the incident light.

In another more specific aspect, the invention deals with light dividing devices utilizing a semitransparent reflector, the transmission-reflection ratio being maintained substantially uniform by converting the polarized component of the impending light into circularly polarized light.

These and other objects, aspects and features of the invention will be apparent from the following description illustrating the genus of the invention with reference to several concrete embodiments thereof. The description refers to the drawing in which:

Fig. 1 is a diagrammatic view of a light splitting device to which the invention may be applied;

Fig. 2 is a schematical plan view of a device according to Fig. 1; and

Figs. 3 to 7 are schematical views, similar to Fig. 2, of several devices incorporating the present invention.

The general principles of the invention will be explained by describing its application to a well-known simple light dividing device, as for example described in United States Patent No. 1,889,030 and diagrammatically shown in Figs. 1 and 2. In this figure, P is a block of glass consisting of two prisms contacting at surfaces M confining therebetween a partly light transmitting reflector, applied for example by way of sputtering or evaporation of metal. An impending light beam L is divided into two component beams R and S, respectively. Two superimposed films 1 and 2, respectively, are exposed in beam S, and a third film 3 in beam R. As described in the above-mentioned patent, films 1 and 2 record the blue and red color aspects, respectively, and 3 the green aspect. Accordingly, the ratio of the amounts of transmitted and reflected light, respectively is predetermined to be about 1:2; in other words, the two superimposed films 1 and 2 are to receive about twice as much light as the single film 3. As indicated above, it was found that the transmission-reflection ratio of a reflector of this type has considerably different values for ordinary and polarized light; for example, a ratio 1:2 for unpolarized light changes to approximately 1:1.3 for a beam consisting only of light vibrating in planes perpendicular to vertical surface V of the prism whereas, for light vibrating in planes perpendicular to horizontal surface H, the ratio becomes approximately 1:3.3. These ratios will, of course, differ for intermediate inclinations of the polarization planes relatively to the reflector, and also with the amount of polarized light in the beam.

The reason for this effect is mainly the extinction effect of reflectors upon polarized light; this and similar phenomena are extensively dealt with in text books on physical optics and need not be gone into for purposes of the present invention which is concerned with their elimination for practical purposes.

It will now be apparent that, with changes of the reflection-transmission ratio caused by variations of the relative amounts of polarized and unpolarized light in the beam, and by variations of the planes of polarization, the exposures on the respective films will vary, making it often very difficult to maintain the correct balance of exposures. Further, the transmission-reflection ratio for different objects in one and the same scene may vary. For example, an article which reflects into the camera light mainly in polarized form may occur in an environment of objects which do not affect the light reflected therefrom in this manner, or to a slighter degree,—as a lacquer or enamel article on dull wood, or a head taken against an indifferently dull background. In such instances, the rendering of the polarizing and non-polarizing objects, respectively, will be different; the dull wood for example being rendered correctly, whereas the lacquer box resting thereon is, especially in its high lights, too green or too red, due to relative overexposure in one of the component beams.

According to the present invention, these detrimental effects are for practical purposes eliminated by converting the plane polarized light, before it reaches the reflector, into a form in which the latter affects it in a manner which is not substantially different from the reflection of non-polarized light for which it is designed. According to the invention, an element is for this purpose introduced into the light path which changes plane polarized into elliptically (including circularly) polarized light, which for the present purpose has the same properties as unpolarized light. Convenient means for converting plane polarized into elliptically polarized light are for example the so-called quarter-wave plates which resolve the plane polarized vibration into two components at right angles to each other with a phase difference of an odd number of quarter periods. Quarter-wave plates can be made of mica or selenite, or of quartz. For present purposes, quarter-wave mica sheets of about .0011 inch (.028 mm.) thickness were found satisfactory.

In order that the light transmitted by the quarter-wave plate be split into two beams by the partially reflecting surface without regard to its original plane of vibration, the quarter-wave plate should be oriented with its crystal optic axis at 45° to plane V in a plane perpendicular to both V and H. There are thus possible any of four positions of the plate which will give successful results. Plane polarized light incident on the quarter-wave plate is then elliptically (including circularly) polarized with planes of vibration parallel to and perpendicular to the optic axis of the plate. In relation to the beam splitter, these planes of vibration are parallel to and perpendicular to the plane bisecting the dihedral angle between V and H and passing through the glass block, and are parallel to the light beam L; the planes of vibration as well as the optical axis of the plate may also be described as forming angles of 45° with the plane through axes L and S of the direct and deflected light beams. Polarized light of either of these azimuths is transmitted and reflected by the partially reflecting surface in the same ratio as unpolarized light.

As shown in Fig. 1, a quarter-wave plate Q can be inserted anywhere in front of the light-dividing surface. Preferably, the plate is cemented to the front face of the prism, as shown in Fig. 2. In this figure, $n$ and $p$ signify the normal and plane polarized components, respectively, of light beam L; plate Q converts component $p$ into elliptically polarized light $e$ which is reflected and transmitted by M in the same manner as the ordinary beam $n$. It will be evident that lens means can be suitably combined with light dividers of this type, as indicated at O of Figs. 2, 5, 6, and 7.

Figs. 3 to 7 show several other embodiments of the invention. In Fig. 3, a device according to copending application Serial No. 59,360, having three prisms components 11, 12, 13 and three reflecting-transmitting surfaces 14, 15, 16 is provided with a quarter-wave plate Q covering that portion of prism 1 which receives the beam L. It will be apparent that the improvement according to the invention is especially important in a device of this type which has five reflecting surfaces and therefore involves many possibilities for variations of the transmission-reflection ratio due to irregularities in the reflection of polarized light.

Fig. 4 shows a light dividing arrangement employing a pellicle reflector 21 of well-known construction instead of a prism. Again, a quarter-plate Q equalizes the reflection-transmission ratio.

The invention is also useful if applied to light dividing devices employing totally reflecting surfaces, as shown in Figs. 5 and 6.

Fig. 5 illustrates schematically the optical arrangement of a light dividing camera employing a rotating mirror 24 having an apertured portion 25 and a reflecting portion 26. Mirror 26 directs the light beam towards film gate 27, whereas aperture 25 passes it, in alternating intervals, towards gate 28. A quarter-wave plate Q in front of the mirror compensates for variations in the absorption of polarized light striking reflector 26 at different angles between reflector and plane of polarization.

Fig. 6 shows a light-dividing device with two totally reflecting prisms 31, 32 partly extending into beam L and reflecting portions thereof towards film holders 33, 34, respectively, whereas an undeviated component of the beam passes on the holder 35. It will be evident that plate Q compensates for variations in the ratio of reflected and undeviated light.

It will now be apparent that the invention can be applied not only to photographic apparatus but to any device where variations of reflection effects are undesirable. As an example, Fig. 7 shows a diagram of the light dividing portion of a conventional stereomagnifier, where M is the semi-reflecting surface dividing the impending light beam L coming from the object into two components $l$ and $r$ which are then deviated into parallel directions for observation with both eyes. Quarter-wave plate Q compensates for variations between the images for the respective eyes which may be detrimental in certain instances.

It should be understood that the present disclosure is for the purpose of illustration only and that this invention includes all modifications and equivalents which fall within the scope of the appended claims.

We claim:

1. Apparatus for dividing a beam of light into component beams comprising a reflector, means for intermittently inserting said reflector into said beam, and compensating means for converting plane polarized light into elliptically—including circularly—polarized light, said compensating means being mounted in said beam before it strikes said reflector, rendering the effect of the reflector substantially independent of plane polarized light which the beam may contain.

2. Apparatus of the type described comprising a light dividing reflector, means for mounting said reflector in the path of a light beam for dividing it into component beams, means in said component beams requiring a substantially constant ratio of the light furnished by the respective component beams, means for converting plane polarized light into elliptically polarized light, and means for mounting said converting means in said beam before it impinges upon said reflector, whereby said converting means renders the effect of the reflector substantially independent of plane polarized light which the beam may contain.

3. Apparatus of the type described comprising a partly transmitting and partly reflecting surface, means for mounting said surface in the path of a light beam for dividing it into component beams, means in said component beams requiring a substantially constant ratio of the light furnished by the respective component beams, means for converting plane polarized light into elliptically polarized light, and means for mounting said converting means in said beam before it impinges upon said surface, whereby said converting means renders the effect of the surface substantially independent of plane polarized light which the beam may contain.

4. Apparatus of the type described comprising a light dividing reflector, means for mounting said reflector in the path of a light beam for dividing it into component beams, means in said component beams requiring a substantially constant ratio of the light furnished by the respective component beams, a quarter wave plate, and means for mounting said plate in said beam before it impinges upon said reflector, whereby said plate renders the effect of the reflector substantially independent of plane polarized light which the beam may contain by converting plane polarized into elliptically polarized light.

5. Apparatus of the type described comprising a reflector, means for mounting said reflector in the path of a light beam for diverting part of said beam thereby providing two component beams, means in said component beams requiring a substantially constant ratio of the light furnished by the respective component beams, means for converting plane polarized light into elliptically polarized light, and means for mounting said converting means in said beam before it impinges upon said reflector, whereby said converting means renders the effect of the reflector substantially independent of plane polarized light which the beam may contain.

6. Apparatus of the type described comprising a partly transmitting and partly reflecting surface, means for mounting said surface in the path of a light beam for dividing it into component beams, means in said component beams requiring a substantially constant ratio of the light furnished by the respective component beams, a quarter wave plate, and means for mounting said plate in said beam before it impinges upon said surface, whereby said plate renders the effect of the surface substantially independent of plane polarized light which the beam may contain by converting plane polarized into elliptically polarized light.

7. Photographic apparatus comprising a light-dividing reflector, lens means to determine with said reflector the path of a beam of light which is by said reflector divided into component beams, means for supporting light sensitive material in said component beams, said material requiring a substantially constant ratio of average amounts of light supplied thereto by their respective beams, compensating means for converting plane polarized light into elliptically—including circularly—polarized light, and means for mounting said compensating means in said beam before it strikes said reflector, whereby the effect of the reflector is rendered substantially independent of plane polarized light which the beam may contain.

8. In optical apparatus of the kind described, in combination a light dividing prism having a light receiving surface, two light transmitting surfaces and therebetween a transparent reflector for dividing a beam admitted through said receiving surface into two component beams and directing said components through said emitting surfaces, respectively, and a quarter wave plate for passing the light incident on said receiving surface.

9. Apparatus for dividing a beam of light into component beams comprising means for reflecting part of the light of said beam to form a second beam whose optical axis intersects the optical axis of the first beam, a quarter-wave plate, and means for mounting said plate in said first beam before it strikes said reflecting means, said mounting means positioning the optic axis of said plate at a forty-five degree angle with the plane through said optical axes.

JOSEPH A. BALL.
WINTON C. HOCH.